United States Patent [19]

Simon

[11] Patent Number: 4,991,421
[45] Date of Patent: Feb. 12, 1991

[54] METHOD FOR EXTRUDING AN ELONGATED, LIGHTWEIGHT RACK

[76] Inventor: Joseph A. Simon, 30855 Little Mack Ave., Roseville, Mich. 48066

[21] Appl. No.: 490,286

[22] Filed: Mar. 8, 1990

[51] Int. Cl.⁵ .................. B21C 23/14; B21C 25/08
[52] U.S. Cl. ........................................ 72/260; 72/266; 72/370; 29/893.35; 29/893.36
[58] Field of Search .................. 72/260, 264, 266, 370; 29/893, 893.3, 893.36

[56] References Cited

U.S. PATENT DOCUMENTS

| | | | |
|---|---|---|---|
| 362,623 | 5/1887 | Heiss | 72/260 |
| 2,452,628 | 11/1948 | Bartlett et al. | 72/370 |
| 4,292,831 | 10/1981 | Simon | 72/266 |
| 4,561,274 | 12/1985 | Kumekawa et al. | 72/370 |
| 4,598,451 | 7/1986 | Ohki | 72/370 |

FOREIGN PATENT DOCUMENTS

| | | | |
|---|---|---|---|
| 129857 | 4/1902 | Fed. Rep. of Germany | 72/266 |
| 204872 | 10/1967 | U.S.S.R. | 72/266 |

*Primary Examiner*—Robert L. Spruill
*Attorney, Agent, or Firm*—Harness, Dickey & Pierce

[57] ABSTRACT

An elongated, rod-like rack for use in an automotive-type steering gear assembly and like mechanisms, is formed of an elongated extruded tube divided lengthwise into a substantially solid rack portion and a substantially hollow, link portion. Transversely extending teeth are broached on the rack portion for engagement with a drive pinion and the like for transmitting power through the rack. The rack is formed by positioning a tubular blank within an open ended extrusion die having an extrusion throat and partially pushing the tubular blank through the throat for extruding the material longitudinally and collapsing radially inwardly top form a substantially solid, elongated rack portion. Then, extrusion is continued with a punch having a mandrel arranged within the blank and within the die throat for extruding a thin wall length, forming the hollow, integral link part of the rack. The trailing end may be terminated in an inwardly extending, thick wall portion suitable for forming threads thereon. The elongated rack part has a fine, axially extending opening along its length resulting from a space left when the material is inwardly collapsed in the die throat for providing a communication passageway.

3 Claims, 2 Drawing Sheets

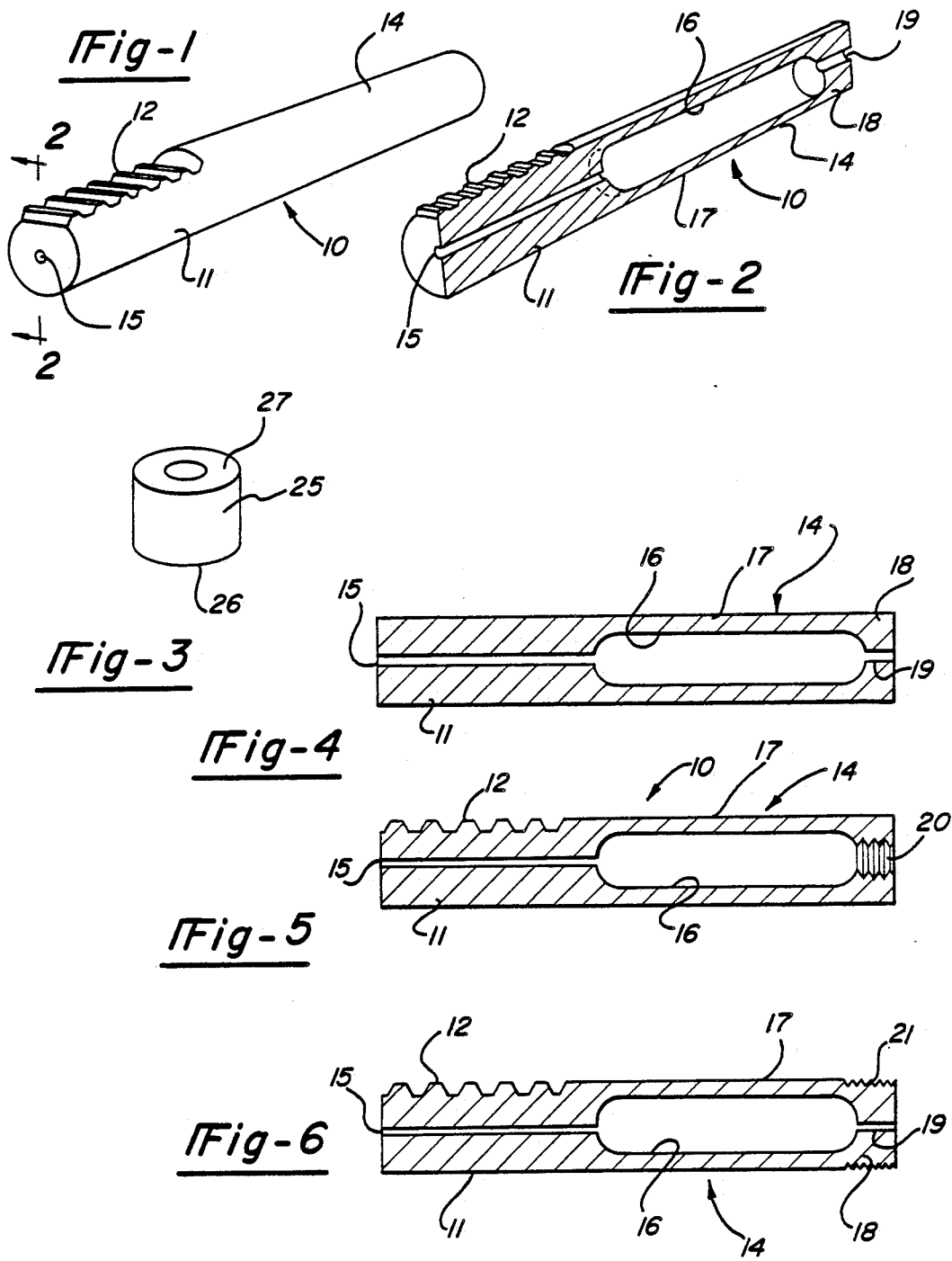

METHOD FOR EXTRUDING AN ELONGATED, LIGHTWEIGHT RACK

BACKGROUND OF INVENTION

This invention relates to an improved, elongated, rod-like, rack used in automotive-type steering gear assemblies and similar types of mechanisms which utilize a pinion means for transmitting power through a rack and linkage to other elements. The improvement is concerned with lightening the weight of the rack and reducing the expense of its manufacture.

Automotive-type steering gear assemblies include an elongated rod which is engaged at one end by a pinion means for moving the rod, and is connected at its opposite end to elements for causing the wheels of the vehicle to turn. In essence, the rod consists of an elongated, steel bar having gear-like rack teeth machined, such as by broaching or machine tool cutting, transversely along one end portion thereof. The opposite end portion is typically provided with external threading for threadedly engaging with a coupling to another element. It is important that the rod-like rack be strong and rigid and, therefore, it is relatively heavy in weight.

Attempts have been made to reduce the weight of the rod-like rack by cutting away portions of the metal. That is, attempts have been made to reduce weight by drilling away the central portion of the link part of the rod, leaving the rack tooth bearing portion solid for strength purposes. However, in drilling the central portion of the rack part of the link of the rod or bar, the remaining wall must be left relatively thick in order to permit forming threads on its free portion. In addition, it is common to drill small openings through various portions of the rack for the passage of fluids therethrough.

The drilling away of portions of the rod or bar, in the vicinity of the link part of the rod, is relatively expensive and time consuming. Thus, there has been a need for some practical, inexpensive, method for producing rod-like racks with substantial hollow portions for lightening the weight of the part while, at the same time, not reducing the overall strength and rigidity of the part. The rack is made by means of a generally known cold forming extrusion process, but with certain improvements. The underlying prior art process is illustrated, for example, in my prior U.S. Pat. Nos. 3,837,205 issued Sept. 24, 1974 for a "Process for Cold Forming a Metal Tube with Inwardly Thickened End", 3,886,649 issued June 3, 1975 for a "Process for Cold Forming a Metal Tube with an Inwardly Thickened End", 4,277,969 issued July 14, 1981 for a "Method for Cold Forming Tubes Within Interior Thicker Wall Sections" and 4,292,831 issued Oct. 6, 1981 for a "Process for Extruding Metal Tube with Inwardly Thickened End Portions". This invention is concerned with providing an improved rack and method for forming the rack by cold extrusion.

SUMMARY OF INVENTION

This invention contemplates forming an elongated, rod-like rack through an extrusion or cold forming process, by which a short, tubular metal blank is extruded through a die to form a substantially solid, rack portion and a relatively thin wall, hollow link portion having a thickened end section for providing internal threads, at the free end of the link portion. The extrusion process, also, produces a central, fine opening through: the otherwise solid rack portion which permits the passage of fluid or air, without further drilling, and which also, lightens the rack somewhat. After the extrusion of the rack is completed, it may be suitably machined, such as by broaching, to form the required external, transverse teeth thereon. Also, the free, thickened end section of the link portion may be threaded internally or externally.

An object of this invention is to rapidly and inexpensively form, through a cold forming extrusion process, an elongated bar-like or rod-like device, one portion of which is substantially solid and the other portion of which is substantially hollow, for forming the solid rack portion upon which teeth may be cut and the hollow, rigid, link portion for transmission of the forces from the teeth to a member coupled to the link.

A further object of this invention is to permit forming a thinner wall link portion on a rod-like rack member while still providing sufficient thickening at the terminal part of the link portion of threading or otherwise applying connector means thereto.

Still a further object of this invention is to provide a rod-like, elongated rack member which is substantially solid to provide sufficient material for cutting threads and, simultaneously, is hollow where possible for reducing weight of the device without reducing its strength.

An additional object is to provide a rack which may be manufactured relatively inexpensively through extrusion procedures rather than through drilling or metal cutting techniques.

These and other objects and advantages of this invention will become apparent upon reading the following description of which the attached drawings form a part.

DESCRIPTION OF DRAWINGS

FIG. 1 is a perspective view of a rod-like, elongated rack member.

FIG. 2 is a cross-sectional, perspective view, taken as if in the direction of arrows 2—2 of FIG. 1.

FIG. 3 is a perspective view of a tubular, metal blank.

FIG. 4 is a cross sectional view, in elevation, of the extruded rack member.

FIG. 5 is a cross sectional view, similar to FIG. 4, but showing the rack teeth and connector threads formed on the rack member.

FIG. 6 is a view similar to FIG. 5, but illustrating a modification where the threads are formed on the exterior of the end of the rack member.

DETAILED DESCRIPTION

Figure 7:
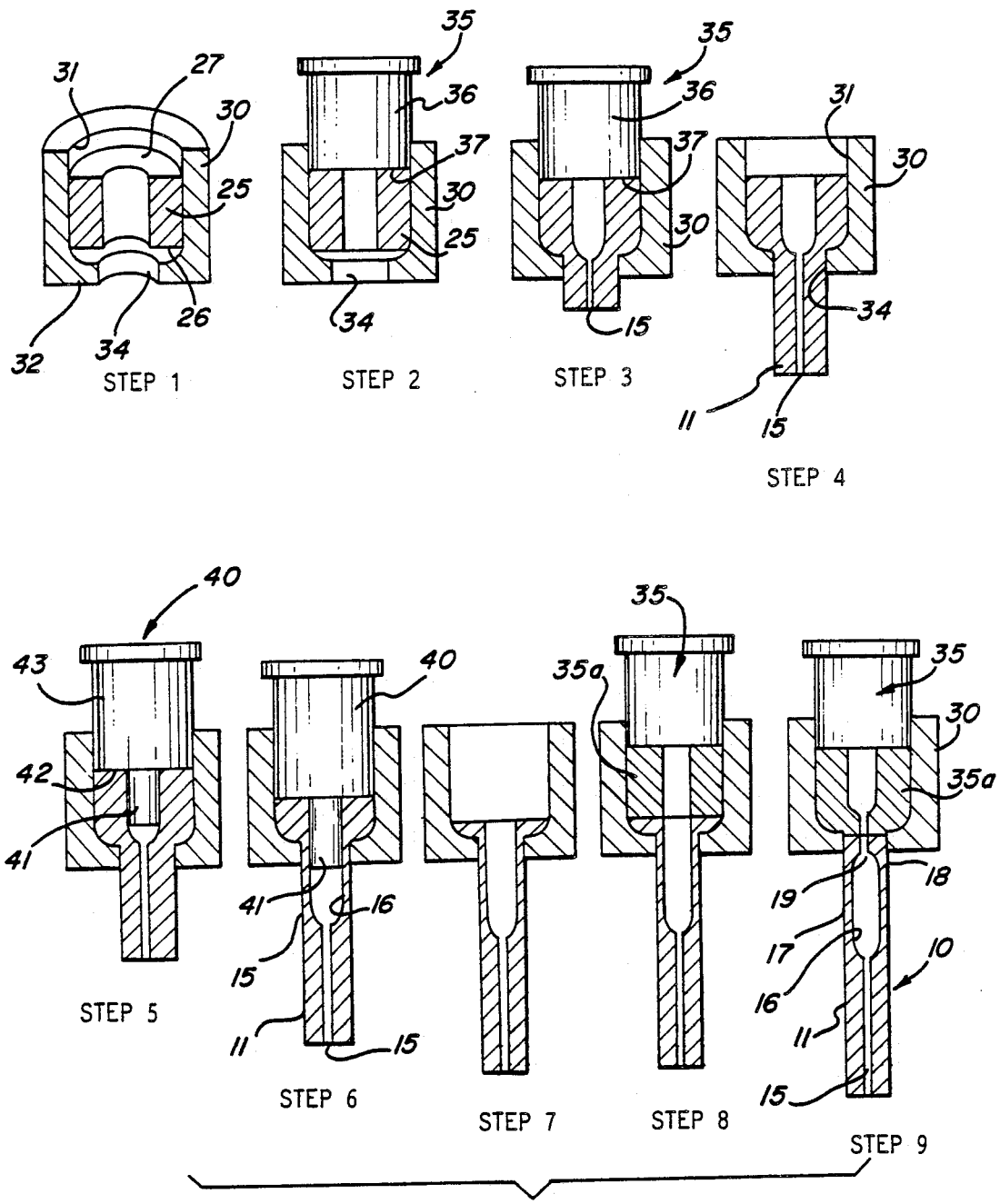
FIG. 7 is a composite view showing nine separate, schematic views illustrating steps 1–9 in the extrusion of the rack member.

FIG. 1 illustrates, in perspective, a rod-like rack 10. The rack is formed of two parts or sections. One section forms a rack part 11 upon which gear-like teeth are cut, such as by broaching transversely of the axis of the rack. The second section, which is the remainder of the rod-like rack, forms an elongated link part 14. As illustrated, in the cross sectional view of FIG. 2, the rack section is substantially solid in cross section. However, it is formed with a fine small diameter, opening 15 extending along its central axis. The link part 14 is formed with a uniform cross section, hollow interior 16. Thus, the link part is provided with a thin wall 17.

The link part is integral, end to end with the rack part. Its free end is preferably formed with a thick wall end section 18 which is provided with a small diameter opening 19 extending along its axis.

As illustrated in FIG. 5, the small diameter opening 19 in the end of the link part may be drilled and tapped to provide an internal thread 20 for connection with a corresponding machine element. Alternatively, the thickened end 18 may have an external thread 21 formed thereon (see FIG. 6) for coupling to another element. Significantly, the thickened end portion provides a wall which is thick enough for threading without adversely affecting the strength of the part. By comparison, the thin wall 17 of the link part may not be thick enough to retain adequate strength if threads or the like are formed either internally or externally of the wall.

In manufacturing the rack, the process begins with a short, tubular blank 30, made of a suitable metal, such as a steel material having the desired characteristics. FIG. 3 illustrates the blank in perspective. The blank opposite ends are designated as a leading end 26 and a trailing end 27. The blank is extruded to form a uniform, exterior diameter bar with uniform diameter hollow interior in the link part, with the fine opening in the rack part, and the opening in the thickened wall part. After the blank is extruded, the rack teeth 12 are cut. In addition, where the part is used in an automotive steering gear, it is necessary to drill transverse holes opening into the hollow interior of the link part and, possibly other locations, to permit fluid flow through the center of the part as may be required. Such holes are omitted, as not forming part of this invention.

FIG. 7 illustrates, schematically, the various steps in making the extruded part. Step 1 shows, in a cross sectional, perspective view, the tubular blank 25 positioned within a tubular die 30 which has an entry end 31 for receiving the blank. The die is also provided with an exit end formed by an annular, radially inwardly extending shoulder 32 which surrounds a constricted die throat 34.

Next, as shown in Step 2, a punch 35 is inserted into the entry end of the die. The punch is provided with a punch body 36 which substantially fills the die transversely. The punch also has a substantially blunt, lead end 37 which presses against the trailing end 27 of the blank. Next, the punch is moved towards the throat, in a longitudinal direction to force the blank through the throat. Conversely, the punch could remain stationary and the die may be moved toward the punch so that the same relative motion is achieved. Thus, in describing the movement of the punch, it should be understood that the movement refers to relative motion with either the punch or the die moving, whichever is preferable for the particular mechanism utilized.

Referring to Step 3, as the punch advances towards the die throat, the leading end of the blank is squeezed or extruded through the die throat. That causes the metal to extrude longitudinally and simultaneously, to collapse radially inwardly. By appropriately selecting the amount of pressure and the sizes of the elements, the inward collapse is not complete. That is, a small space is left along the axis of the extruded part to provide a central, fine opening 15. The diameter of the opening may vary considerably. For example, in a part which is about 22 inches long, with a hollow section about 14 inches long, and ¾ of an inch in diameter, an opening of less than 1/10 of an inch may be formed. The sizes of the parts and their openings may vary considerably, depending upon the particular size and strength requirements of the part. For practical purposes, the cross section of the rack section is substantially solid with the fine opening serving as a means for passing fluid, such as compressed air or oil, etc.

Upon extrusion of the rack section, as shown in Step 4, the punch is removed from the die. Then, another punch 40, see Step 5, is inserted in the die. This punch is provided with a mandrel-like extension 41 and has an annular shoulder 42 surrounding the upper end of the mandrel, at the lower end of the punch body 43.

The mandrel 41 is positioned within the interior of the remaining portion of the blank. Then, as illustrated in FIG. 6, the punch is moved so that its mandrel is located within the center of the die throat while the extrusion continues. In that manner, the hollow interior, thin wall, link section is extruded. When the extrusion is almost complete, the punch is removed. (See Step 7).

Next, a second tubular blank 35a, illustrated in Step 8, is placed within the die and the original punch 35 reinserted. Movement of the punch 35 begins the extrusion of the second blank while completing the extrusion of the first blank. Thus, the trailing end of the first blank collapses inwardly to form the thickened end wall portion 18.

Where desired, a third punch may be utilized which has a mandrel, like the mandrel of punch 40, but of a narrower cross sectional diameter so that the opening 19 in the thickened wall 18 may be controlled and made of a much larger diameter. In that case, that additional punch may be used to form the thickened end section 18 and then removed for continuing with the process.

It is intended that the process be continuously performed by repeating the sequence of steps described above. However, it is possible to reverse the sequence of steps by forming the hollow portion and thickened end portion of the link section first and, thereafter, forming the substantially solid rack section. In that case, a two step mandrel, i.e., having a narrower forward end and a wider rear end, may be utilized to first extrude the thickened wall section 18 with the narrower mandrel end and then, the wider diameter hollow portion of the link section with the wider mandrel. Then, the punch may be replaced with a blunt end punch to form the substantially solid rack section.

This invention may be further developed within the scope of the following claims. Accordingly, it is desired that the foregoing description be read as being merely illustrative of an operative embodiment of this invention and not in a strictly limited sense.

Having fully described an operative embodiment of this invention, I now claim:

1. A method for making an elongated rack for use in transmitting forces from a pinion means in an automotive-type steering gear assembly, and formed of an elongated rack part integral end to end with an elongated link part, comprising:

positioning a short, tubular, metal blank within an open ended tubular die having an entry end and an extrusion end which is formed by an annular, radially inwardly extending, continuous, die extrusion throat of smaller cross sectional area than the blank, through which the blank is extruded;

inserting a punch having a force applying, relatively blunt leading end surface, into the die entry end for closely fitting within the die, with the punch leading end surface engaging and overlapping the complete trailing end of the blank, that is, the annular end and opening in the blank end which are furthest from the die throat;

moving the punch, relative to the die, longitudinally towards the die throat and extruding the leading end portion of the blank, that is, the portion which is initially closest to the die throat, through the die throat and collapsing the blank leading end portion radially inwardly during the longitudinal extrusion thereof through the throat to leave a small diameter, central space extending along the axis of the extruded leading end portion for forming the longitudinally extending rack part with a fine central opening extending along its axis;

removing the punch and replacing it with a punch having a mandrel extending longitudinally into the blank and with the punch having an annular shoulder engaging the annular trailing end of the blank, and moving the punch relative to the die throat and positioning the mandrel within the die throat for extruding a thin wall, tubular, link part around the mandrel and through the throat;

whereby the blank leading portion forms the integral rack part, with its fine, central opening extending along its horizontal axis and communicating with a large, substantially uniform diameter, hollow space within the integral, thin wall tubular link part formed by the trailing end portion of the blank by the extrusion through the die throat;

and whereby a number of teeth may be relatively deeply cut in the external surface of the rack portion subsequent to the extrusion thereof.

2. A method as defined in claim 1, and including inserting a second blank in the die, just before completing extruding the first mentioned blank through the die;

and inserting a punch in the die and pushing the second blank towards the throat for engaging and pushing the first mentioned blank through the throat for completion of the extrusion of the first mentioned blank;

and extruding an inwardly thickened trailing end section within the trailing end of the first mentioned blank, and with a central axially extending space formed in the thickened end portion for substantially closing the trailing end of the thin wall link part;

whereby the thickened end section may be later provided with means for connecting it with a separate, corresponding part.

3. A method as defined in claim 2, and including broaching transversely extending, spaced apart gear-like teeth in the rack part along a substantial portion of its length, for subsequent engagement with a pre-determined size pinion means.

* * * * *